Figure 1:
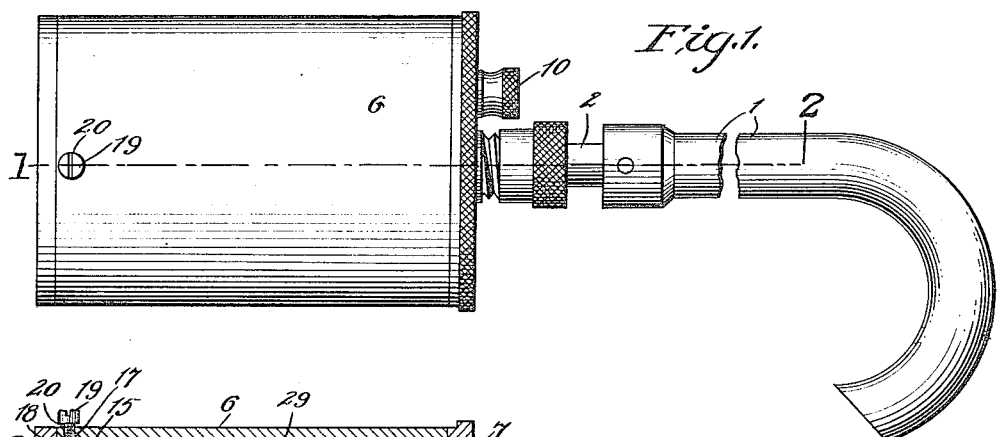

T. B. LEAR.
STAMPING TOOL OR PUNCH.
APPLICATION FILED OCT. 22, 1915.

1,210,956.

Patented Jan. 2, 1917.

Inventor:
Thos B Lear

UNITED STATES PATENT OFFICE.

THOMAS B. LEAR, OF WASHINGTON, DISTRICT OF COLUMBIA.

STAMPING-TOOL OR PUNCH.

1,210,956.             Specification of Letters Patent.        Patented Jan. 2, 1917.

Application filed October 22, 1915. Serial No. 57,369.

(DEDICATED TO THE PUBLIC.)

*To all whom it may concern:*

Be it known that I, THOMAS B. LEAR, an employee of the Department of Agriculture of the United States of America, residing in the city of Washington, District of Columbia, (whose post-office address is Washington, District of Columbia,) have invented a new and useful Stamping-Tool or Punch.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to me of any royalty thereon.

My invention has for its object the providing of a stamping tool or punch which will enable the user to mark the hide of a live animal with a permanent identification mark just below the surface of the hide, for purposes hereinafter explained.

It is well known that in the animal breeding industry the breeders brand the animals with marks so as to afford a means by which the pedigree of the animals may be traced. Again, rangers adopt this method of branding animals on their ranges with a view of indicating their identity and ownership. In addition, cattle, sheep, swine, and goats inspected under the provisions of the meat inspection act of June 30, 1906, are, under certain conditions, required to be tagged or marked. This law requires Government inspectors performing the inspection work provided for therein to give such animals a rigid ante-mortem inspection when the animals are offered for slaughter at establishments operating under Federal supervision. If any of the animals on ante-mortem examination disclose or are suspected of having symptoms of any disease, the inspectors are required to tag such animals with a tag marked "U. S. suspect." Animals of this class are required to be slaughtered separately and apart from animals which were passed on ante-mortem inspection. Marking suspected animals with tags is not satisfactory, for the reason that the tags may be easily lost or removed, and in such cases the inspectors cannot readily identify the animals which have been tagged.

My invention is primarily designed to obviate this difficulty, and to meet the needs of the breeding and ranging industries in having a device easy and convenient of operation and which will perform the function of giving to animals a clear and permanent identification mark. Its mechanism may be constructed so that it will be capable of applying any desired mark or design to animals.

Figure 2:
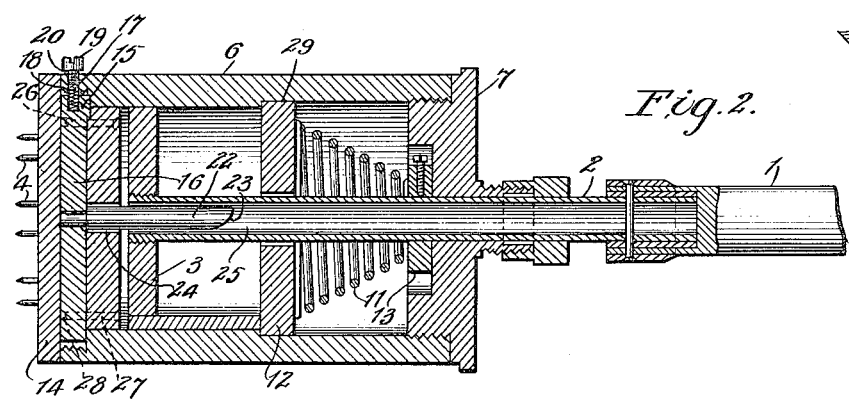
Figure 3:
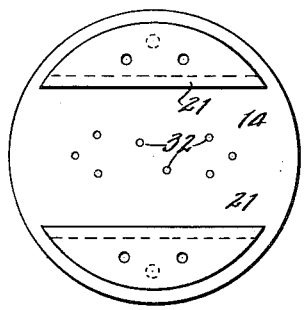
Figure 4:
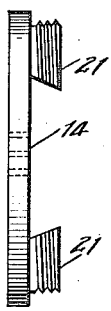
Figures 5, 6:
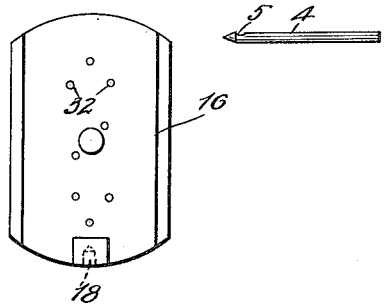

The nature, characteristic features and scope of my invention may be more readily understood from the following description, taken in connection with the accompanying drawings forming a part hereof, wherein:

Figure 1 is a side view of my invention; Fig. 2 is an enlarged sectional view on line 1—2, Fig. 1. Fig. 3 is a rear elevation of the main bottom. Fig. 4 is a side elevation of the same. Fig. 5 is a rear elevation of the cutoff valve and Fig. 6 is a detail view of one of the needles.

Referring to the drawings, 1 represents a handle of the mechanism provided, at one of its ends, with a plunger rod, 2. This rod has fastened to its free end a plunger or piston, 3, having secured to the lower face thereof a plurality of needles, 4. These needles are arranged so as to form various letters or symbols representing the impression which the device is designed to make on animals. Special attention is called to the construction of these marking needles. It will be noted that cavities or semi-circular receptacles, 5, are formed near their pointed ends. The specific purpose of these receptacles is to facilitate the carrying of a predetermined amount of ink into the hide of the animal to be marked and to discharge the ink into the animal's hide when the plunger, 2, has finished its downward stroke in the operation of the device.

The elements of my invention, which I have hereinbefore described, with the exception of the handle, 1, are adapted to be inclosed by a cylindrical inkwell or casing, 6, and to work within that member. The inkwell or casing, 6, is closed at its lower end, while its top is provided with a removable screw threaded cover, 7, having an opening in its center for the reception of the plunger rod, 2, and a second opening, 9. This latter opening is employed for the purpose of permitting the well or casing, 6, to be filled with ink, and it is closed by a threaded plug, 10. Adjusted on the plunger, 2, is a spring, 11, a movable disk, 12, and a stationary collar, 13. Said spring is adjusted intermediate the disk, 12, and collar, 13, and is employed for returning the plunger to a closed position after the marking is completed.

Near the primary or main bottom, 14, of the well, 6, I place a false bottom, 15. It will be apparent from this arrangement, there is left a space between the two bottoms, 14 and 15. In this space I place a cutoff or sliding valve, 16, the movement of which is controlled by a spring, 17, which is adjusted in an aperture, 18, cut in the side of said valve, and is held in place by a threaded stop plug, 19, engaging the threaded opening, 20, in the cylindrical casing, 6. This cutoff, 16, is held in operative position by means of the lugs, 21, which may form an integral part of the bottom, 14, or be adjusted thereto in any satisfactory manner. Said valve, 16, acts as an automatic cutoff. It has secured to its upper base a vertical lug, 22, the top portion of which is slightly cut or curved off, as shown at 23, so as to form a cam surface.

An opening, 24, is cut in the center of the false bottom, 15, through which passes the vertical lug, 22, for entering the hole, 25, in the plunger rod, 2. The false bottom, 15, is secured to the lugs, 21, by means of screws, 26, passing through the threaded apertures, 27, in said bottom and engaging the threaded openings, 28, in said lug.

On the interior of the cylinder, 6, at a desired point, I provide a ridge, 29, which is adapted to anticipate the movement of the disk, 12, when the plunger rod is thrust forward, thereby causing the spring, 11, to contract and serve to return the plunger to closed position. The piston, 3, is smaller in diameter than the disk, 12, which enables that member to pass the ridge, 29, without hindrance. Secured to the interior of the casing, 6, is a guide lug, 30, which engages one of the slots, 31, in the side of the piston, 3, for holding the piston in true position so that the needles, 4, may not be thrown off course in the forward movement of the plunger rod, 2.

The main bottom, 14, may be secured to the cylinder, 6, in any suitable way, the primary object being to prevent the cylinder from leaking. I find that by providing the lugs, 21, and the lower interior end of the cylinder with threads, and adjusting these parts by means of their threaded portions, the bottom end of the cylinder may be tightly closed.

A series of apertures or perforations, 32, are cut in the false bottom, 15, cutoff, 16, and the main bottom, 14. These perforations are arranged in these elements so as to form the design represented by the needles, 4. In addition, they are so arranged that, when the cutoff, 16, is released, they provide an uninterrupted outlet through which the needles, 4, pass from the interior of the cylinder, 6, to contact with the animal to be marked, upon pressure being applied to the handle, 1.

The operation of my device is as follows: I first fill the well, 6, with indelible ink or other suitable fluid. I then bring the object to be marked in contact with the bottom of the mechanism and give the handle, 1, a quick blow or thrust. This blow causes the plunger, 2, to descend within the well, 6, and as it moves downward it engages the vertical lug or cam, 22, which enters the hole, 25, in said plunger. This action imparts a sliding movement to the lug or cam, 22, which, in turn, carries with it the cutoff, 16, against the tension of the controlling spring, 17, thereby throwing the cutoff rearward so that the holes or apertures, 32, cut therein are brought to register with the holes, 32, in the false and main bottoms, 15 and 14, thus allowing the needles, 4, to pass therethrough into the animal. In the forward movement of the needles, the receptacles, 5, take up ink from the well and convey and deposit the fluid in the punctured parts made by the needles, leaving an indelible mark upon the animal. Upon conclusion of the stroke, and release of pressure on the handle, 1, the plunger automatically returns to closed position. This action is accomplished by means of the spring, 11. When the plunger is thrust forward, it carries with it simultaneously said spring, disk, 12, and stationary plate, 13. The disk, 12, however, is obstructed in its forward movement by ridge, 29, provided on the interior of the cylinder, 6. The pressure on the handle carries the stationary disk, 13, against the spring, 11, and forces it against disk, 12, causing the spring to contract. Upon removal of the pressure, the spring, 11, being released, automatically throws the plunger backward to its position of rest. The backward movement of the plunger carries with it the needles, 4. The needles are thus withdrawn from the perforations in the cutoff, 16, and in the false and main bottoms, 15 and 14. The plunger, in its return movement, disengages the vertical lug or cam, 22, which action allows the cutoff, 16, automatically to turn to its original position, thereby stopping all possible flow of the ink in said well.

From the foregoing, it is thought the construction, operation, and many advantages of the herein described invention will be apparent to those skilled in the art without further description, and it will be understood that various changes in the size, shape, proportion, and minor details of construction may be resorted to without departing from the spirit or sacrificing any of the advantages of the invention.

Having thus fully described my invention, I claim:

1. A stamping device, comprising a plunger rod having secured thereto a piston provided with a series of needles spaced in the form of a design, and adjusted in operative position within a casing provided with dual bottoms and an automatic cutoff, each having a plurality of perforations arranged to represent the design formed by said needles, a handle to control said plunger, a lug secured to said cutoff, and a spring having contact therewith, means for releasing said cutoff and bringing said perforations to register with each other for providing an outlet through which said needles pass from said casing to the object to be marked, substantially as specified.

2. A stamping device, comprising a plunger rod having secured thereto a piston having slots in the side thereof, carrying a plurality of needles having cavities near their pointed ends, said needles arranged in the form of a design, a stop plate and disk adjusted on said rod, and a spring disposed intermediate said plate and disk, said elements operating within a casing having a ridge and a guide bar secured to its interior, and provided with false and main bottoms, an automatic cutoff valve adjusted between said bottoms, perforations in said bottoms and valve arranged in the form of the design of said needles, means for releasing said cutoff for bringing said perforations to register with each other for providing exit from the casing for said needles, and automatic means for returning said needles in said valve to closed position, substantially as specified.

3. A stamping device, comprising a plunger rod having secured thereto a piston carrying a series of needles having cavities, said needles arranged in the form of a design and said elements operating within a casing provided with false and permanent bottoms, an opening in the center of said false bottom, a cutoff valve adjusted between said bottom and lugs for holding said bottom in place, and a spring having contact therewith for returning said valve to closed position, a vertical lug having a curved top secured to said valve, said lug passing through said opening in said false bottom and adapted to form contact with said plunger, a plurality of holes in said bottoms and valve arranged to form the design formed by said needles, means for adjusting said parts together in operative position and automatic means for opening and closing said valve and bringing said holes to register with each other, substantially as specified.

In testimony whereof, I affix my signature in the presence of two subscribing witnesses.

THOMAS B. LEAR.

Witnesses:
GEORGE L. HOFFMAN,
THOMAS SHAW.